United States Patent [19]

Nied et al.

[11] Patent Number: 5,265,791
[45] Date of Patent: Nov. 30, 1993

[54] METAL ALLOY SOLID STATE JOINING BY LOCAL INTERFACIAL STRAIN CONTROL

[75] Inventors: Herman A. Nied, Ballston Lake; Robert E. Sundell, Clifton Park, both of N.Y.

[73] Assignee: General Electric Company, Schenectady, N.Y.

[21] Appl. No.: 970,748

[22] Filed: Nov. 2, 1992

[51] Int. Cl.$^5$ .............................................. B23K 20/00
[52] U.S. Cl. ..................... 228/116; 228/174; 228/265
[58] Field of Search ............... 228/115, 116, 164, 170, 228/174, 193, 233, 265, 3.1

[56] References Cited

U.S. PATENT DOCUMENTS

| | | | |
|---|---|---|---|
| 4,269,344 | 5/1981 | Vervliet | 228/265 |
| 4,722,469 | 2/1988 | Rydstad et al. | 228/193 |
| 4,732,312 | 3/1988 | Kennedy et al. | 228/193 |
| 4,964,564 | 10/1990 | Neal et al. | 228/265 |

FOREIGN PATENT DOCUMENTS 250891  12/1985  Japan ..................... 228/116

OTHER PUBLICATIONS

Metals Handbook Ninth Edition, vol. 6, pp. 680-683, copyright 1983.
"Interface Displacement Characteristics of Upset Welding" by Herman A. Nied, 2nd International Conference on Trends in Welding Research.

*Primary Examiner*—Samuel M. Heinrich
*Attorney, Agent, or Firm*—James R. McDaniel; Paul R. Webb, II

[57] ABSTRACT

This invention relates to the solid state joining of metal alloy pieces in order to form an integral structure. Such structures of this type, generally, allow the metal alloy pieces to be joined by local interfacial strain control.

11 Claims, 4 Drawing Sheets

1

METAL ALLOY SOLID STATE JOINING BY LOCAL INTERFACIAL STRAIN CONTROL

BACKGROUND OF THE INVENTION

1. Field of the Invention

This invention relates to the solid state joining of metal alloy pieces in order to form an integral structure. Such structures of this type, generally, allow the metal alloy pieces to be joined by local interfacial strain control.

2. Description of the Related Art

In conventional upset welding process, surfaces to be joined are purposely machined flat and smooth in order to obtain an intimate contact at the interface between the surfaces. The objective is to bring the surfaces into intimate contact for breaking down surface asperities and contaminates, in order to have atomic forces provide the bond. It is thought that once the contaminates and oxides are broken up, their redistribution will help the bonding process. While these bonding processes have met with a modicum of success, the surface material close to the stagnation region is not substantially displaced even though the material is subjected to severe strain and large upset welds are made. Therefore, a more advantageous upset welding process, then, would be presented if such amounts of surface material close to the stagnation region were more evenly displaced.

It is apparent from the above that there exists a need in the art for a solid state joining method which is capable of joining metal alloys, and which at least equals the joining characteristics of the known joining processes, but which at the same time substantially displaces the surface material close to the stagnation region. It is a purpose of this invention to fulfill this and other needs in the art in a manner more apparent to the skilled artisan once given the following disclosure.

SUMMARY OF THE INVENTION

Generally speaking, this invention fulfills these needs by providing a metal alloy solid state joining method which uses an apparatus having a first metal alloy component having first and second ends and a second metal alloy component having first and second ends, such that said method is comprising the steps of: surface treating said first ends of said first and second metal alloy components to create a first predetermined geometrical pattern on said first component and a second predetermined geometrical pattern on said second component; aligning said first ends of said first and second components such that said first ends are substantially contacting each other along their entire patterns and are substantially perpendicular to each other; and pressing said first and second metal alloy components together such that said first ends are joined together to create a solid state joint between said first and second metal alloy components.

In certain preferred embodiments, the metal alloy pieces can be either of the same material or dissimilar materials. Also, the geometrical pattern may be crosswise grooves, lengthwise grooves, V-notches or special grooves.

In another preferred embodiment, the surface treatment of the metal alloy pieces provides the maximum disruption of the entire surface of the metal alloy pieces during the upset process. This is achieved by preparing the surfaces to be joined with the texture that will enhance the breakup of the original surface and provide some mechanical interlocking.

The preferred solid state joining method, according to this invention, offers the following advantages: excellent joining characteristics; the ability to use similar or dissimilar materials; good durability; ease of joint formation; and good economy. In fact, in many of the preferred embodiments, these factors of joining characteristics, similar and dissimilar materials, and ease of joint formation are optimized to an extent that is considerably higher than heretofore achieved in prior, known solid state joining methods.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Some metals and alloys are difficult to join with a solid state joining process such as diffusion bonding or upset welding. This becomes particularly difficult when dissimilar materials are to be bonded. A typical approach is to join the metals at elevated temperatures with the faying surfaces ground flat to provide a well distributed contact area during the bonding process. As described above, while most of the surface material is displaced and locally deformed during these processes, the material near the center of the component is subjected to severe compression and elongation without substantial displacement. This results in a stagnation zone.

Figure 1:
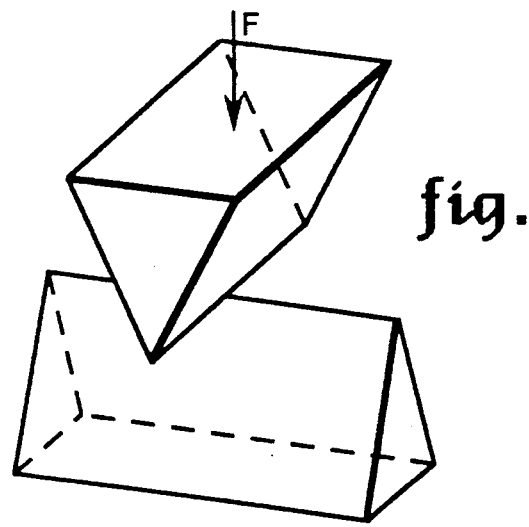
FIG. 1 is a schematic illustration of deformation pattern for two saw toothed ridges at right angles with respect to each other, according to the present invention.

Consider the deformation pattern for two saw tooth ridges having their apexes in contact with one another without any forces applied when they are at right angles with respect to each other, as shown in FIG. 1. When forces are applied in the vertical direction, along the direction of arrow F, the two metal prisms will indent each other easily due to the extremely high contact stress. The plastic deformation will provide an interlocking mechanism.

Figures 2A, 2B:
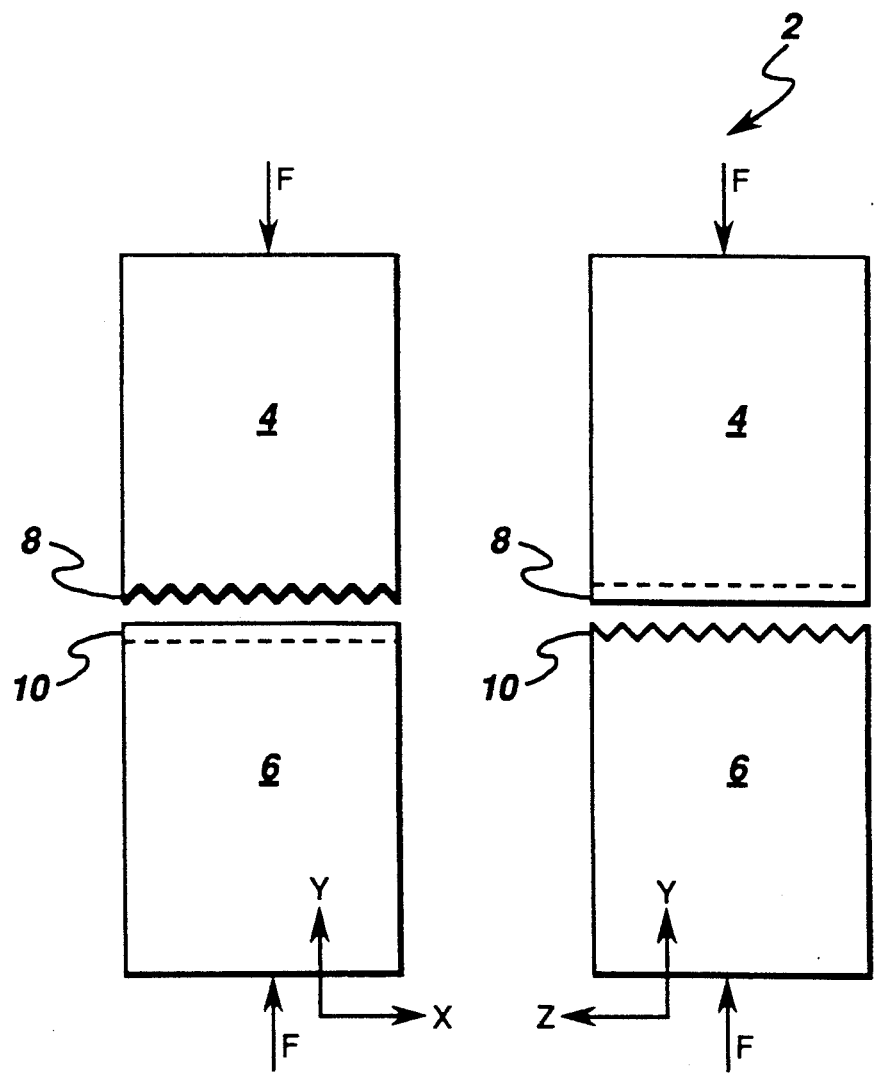
FIGS. 2a and 2b are schematic illustrations of two surface treated metal alloy components prior to being joined, according to the present invention.

Now consider the joining of two components by either upset welding or diffusion bonding, as shown in FIGS. 2a and 2b. In particular, FIG. 2a illustrates a front view of welding system 2 having parallel patterns 8, 10 in top and bottom components 4, 6, respectively, such that the patterns 8 in the top component 4 are perpendicular to the patterns 10 in the bottom component 6. FIG. 2b illustrates the end view of these same two components. It is to be understood that components 4, 6 can be plates, bars, or thick cylindrical shells. It is to be noted that the height of the patterns 8, 10 will be determined by the material ductility, the initial microstructure and the degree of local plastic strain needed for a quality bond.

Micro asperities within components 4, 6 are the source of voids which are aligned essentially along a bond plane. A purposely machined roughened surface is used in a way to control and enhance the local plastic deformation at elevated temperatures in order to eliminate these voids. In addition, more surface is made available by this process and dynamic grain growth would occur in both longitudinal and transverse directions at elevated temperatures. Again, the material near the center of the components to be welded experiences essential local flow and rearrangement; whereas, by conventional processing the surface material in this region has little or no displacement which results in a stagnation zone with a plane of weakness.

Figure 4:
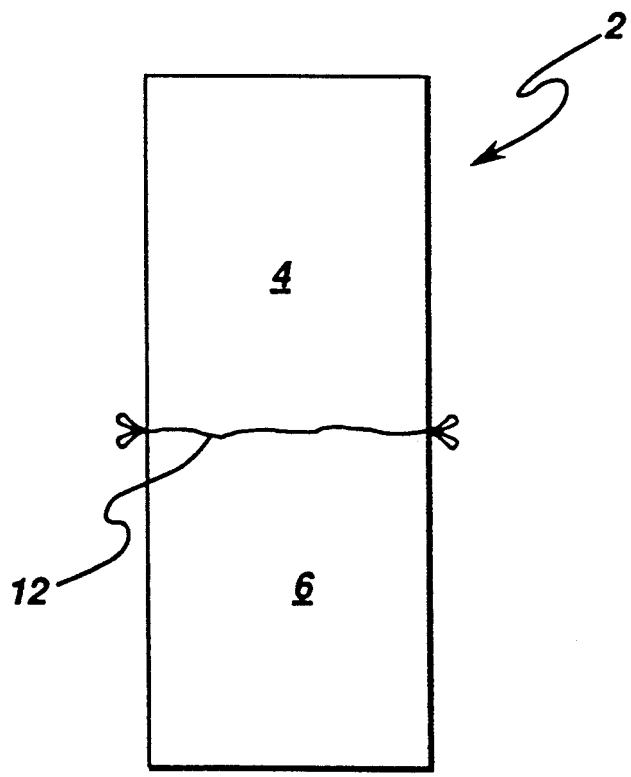
FIG. 4 is a schematic illustration of the surface treated metal alloy components, after the joint is formed between them, according to the present invention.

During the operation of joining system 2 (FIGS. 2a and 2b) components 4 and 6 are machined by conventional machining techniques with surface patterns 8 and 10 respectively. Components 4 and 6 can either be constructed of similar or dissimilar materials. Also, surface patterns 8 and 10 can be crosswise grooves, lengthwise grooves, V-notches, spiral grooves, and/or radial serrations. It is noted that the design of the configurations must be such that when components 4 and 6 are placed in contact with each other, patterns 8 and 10 provide a localized strain control during the joining process which, ultimately, provides extremely high local dynamic recrystallization of the patterns 8 and 10. This is accomplished by placing the apexes of patterns 8, 10 at right angles with respect to each other. After patterns 8 and 10 are machined into components 4 and 6, respectively, components 4 and 6 are placed in contact with each other. A force F is applied to components 4 and 6 to cause a joint 12 to be formed between components 4 and 6 (FIG. 4). A weld upset greater than the combined height of patterns 8, 10 will eliminate any initial voids or gaps due to the surface patterns 8, 10.

Figure 3A:
FIGS. 3a to 3c show various configurations and surface patterns on the metal alloy components, according to the present invention.
Figure 3B:
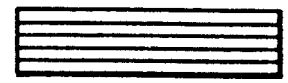
Figure 3C:
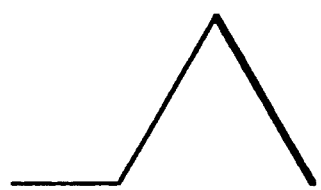

FIGS. 3a–3c illustrate other types of surface configurations and patterns which may be machined by conventional machining techniques onto the surfaces of the components 4, 6. In particular, FIG. 3a illustrates crosswise grooves. FIG. 3b illustrates lengthwise grooves. FIG. 3c illustrates a V-notch.

Figure 5:
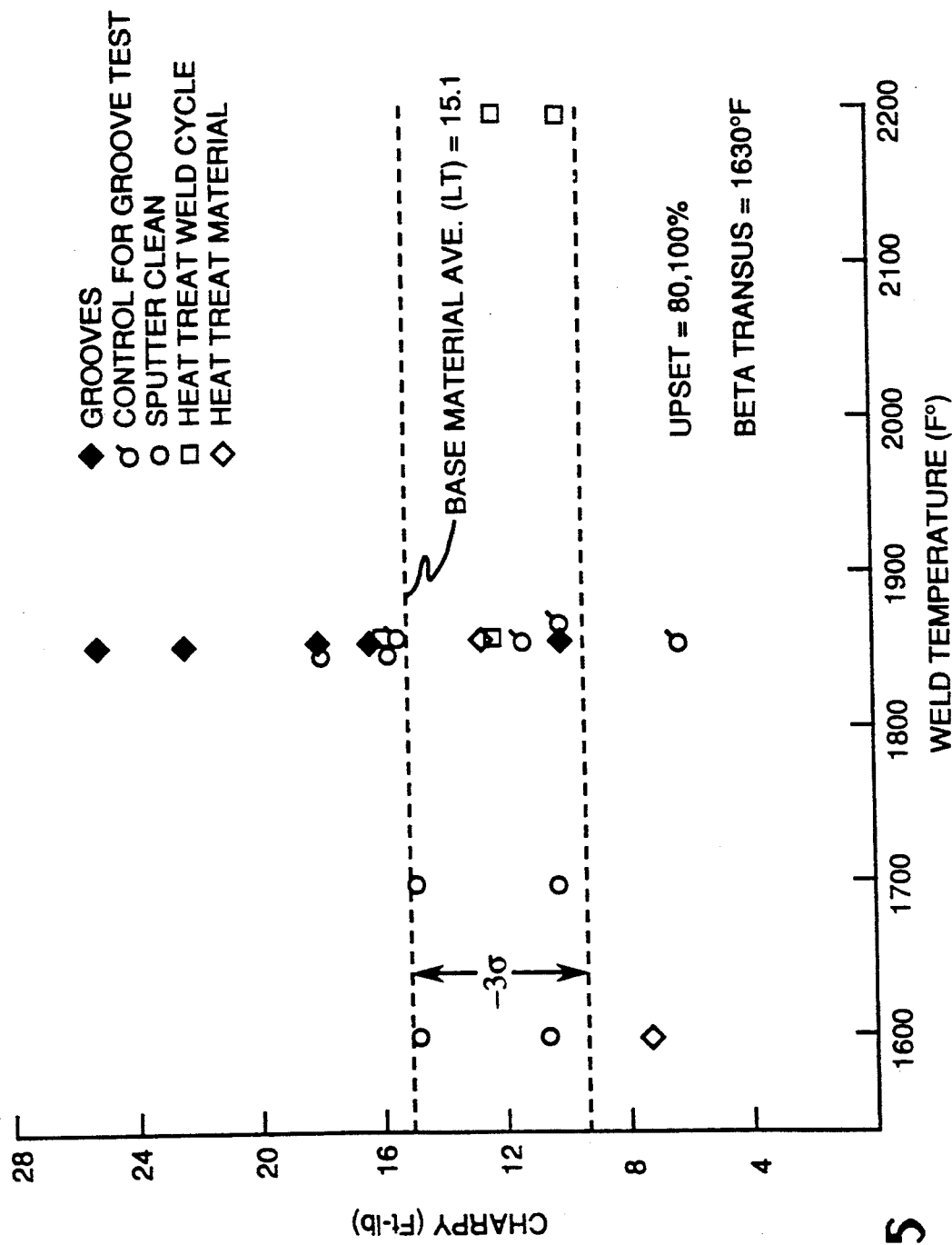
FIG. 5 is a graphical illustration of charpy in (Ft-Lbs.) versus weld temperature in (°F.) for unnotched metal alloy pieces.

FIG. 5 is a graphical illustration of unnotched charpy specimens. In particular when the data of grooved specimens is compared to ungrooved specimens, there is a significant increase in the fracture energy needed to fracture the bond.

Figure 6:
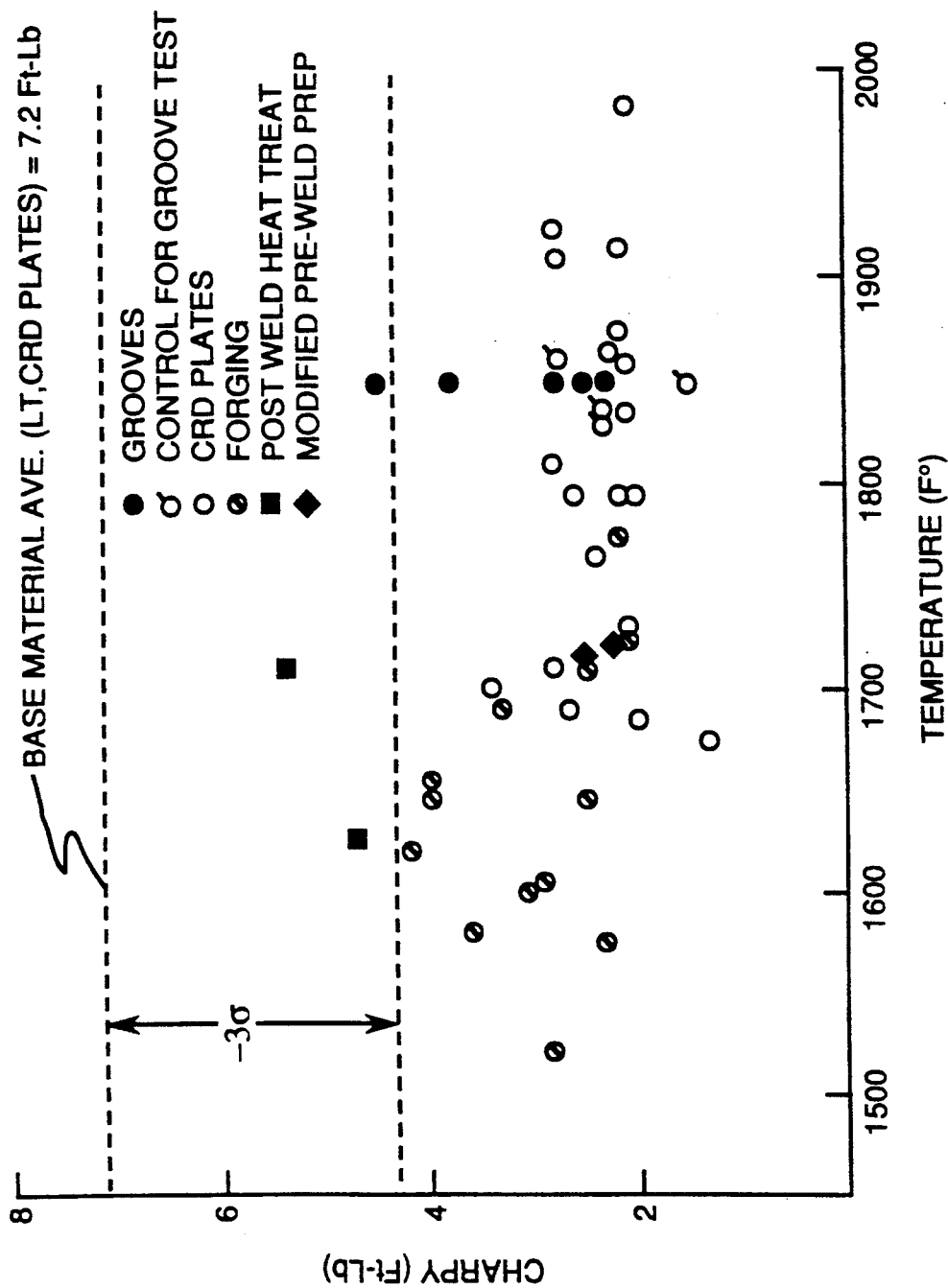
FIG. 6 is a graphical illustration of charpy in (Ft-Lbs.) versus temperature in (°F.) for notched metal alloy pieces.

FIG. 6 is a graphical illustration for notched charpy tests. This figure also illustrates that when the data of grooved specimens is compared to the ungrooved specimens there is also a significant increase in fracture energy.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A metal alloy solid state cold joining method which uses an apparatus having a first metal alloy component having first and second ends and a second metal alloy component having first and second ends, such that said method is comprised of the steps of:
   surface treating said first ends of said first and second metal alloy components to create a first predetermined geometrical pattern on said first component and a second predetermined geometrical pattern on said second component;
   aligning said first ends of said first and second components such that said first and second patterns are substantially contacting each other along their entire patterns and are substantially perpendicular to each other; and
   pressing said first and second metal alloy components together such that said first ends are joined together to create a solid state joint between said cold first and second metal alloy components.

2. The method, as in claim 1, wherein said components are further comprised of:
   similar materials.

3. The method, as in claim 1, wherein said components are further comprised of:
   dissimilar materials.

4. The method, as in claim 1, wherein said first and second predetermined geometrical patterns are further comprised of:
   grooves.

5. The method, as in claim 1, wherein said first and second predetermined geometrical patterns are further comprised of:
   notches.

6. The method, as in claim 1, wherein said first and second predetermined geometrical patterns are further comprised of:
   spiral grooves.

7. The method, as in claim 1, wherein said second predetermined geometrical patterns are further comprised of:
   lengthwise grooves.

8. The method, as in claim 1, wherein said second predetermined geometrical patterns are further comprised of:
   crosswise grooves.

9. The method, as in claim 1, wherein said first and second metal alloy components are further comprised of:
   plates.

10. The method, as in claim 1, wherein said first and second metal alloy components are further comprised of:
    bars.

11. The method, as in claim 1, wherein said first and second metal alloy components are further comprised of:
    cylindrical shells.

* * * * *